United States Patent
Bremer et al.

(10) Patent No.: US 9,280,880 B1
(45) Date of Patent: Mar. 8, 2016

(54) METHOD AND SYSTEM FOR GENERATING ALTERNATIVE IDENTIFICATION PAYMENT CARDS

(71) Applicant: MASTERCARD INTERNATIONAL INCORPORATED, Purchase, NY (US)

(72) Inventors: Philippa Jane Penn Bremer, Northampton (GB); Robert Colin Ward, Essex (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 14/514,846

(22) Filed: Oct. 15, 2014

(51) Int. Cl.
*G06K 1/12* (2006.01)
*G06K 15/02* (2006.01)
*G06Q 20/26* (2012.01)
*G07F 17/42* (2006.01)
*G06Q 20/34* (2012.01)
*G06F 3/12* (2006.01)

(52) U.S. Cl.
CPC .............. *G07F 17/42* (2013.01); *G06F 3/1243* (2013.01); *G06K 1/121* (2013.01); *G06K 15/021* (2013.01); *G06K 15/1848* (2013.01); *G06Q 20/26* (2013.01); *G06Q 20/34* (2013.01)

(58) Field of Classification Search
USPC ................................................ 358/1.19, 1.18
See application file for complete search history.

(56) References Cited

U.S. PATENT DOCUMENTS

| 8,695,882 B2* | 4/2014 | Halbur | G06Q 30/00 235/487 |
| 2010/0127083 A1* | 5/2010 | Brown | G07F 7/0806 235/492 |
| 2012/0136780 A1* | 5/2012 | El-Awady | G06Q 20/14 705/40 |

* cited by examiner

Primary Examiner — Ngon Nguyen
(74) Attorney, Agent, or Firm — Buchanan Ingersoll & Rooney PC (57) ABSTRACT

A method for generating alternative identification payment cards includes: storing, in a database, a plurality of payment account numbers, wherein each payment account number is associated with a payment account; generating, by a processing device, an alternative identification number for each payment account number of the plurality of payment account numbers, wherein the alternative identification number includes at least a program identifier, a unique identifier, and a check value; generating, by the processing device, a data file including each payment account number of the plurality of payment account numbers and the generated alternative identification number for each respective payment account number; and transmitting, by a transmitting device, the generated data file for printing a plurality of payment cards.

20 Claims, 6 Drawing Sheets

FIG. 6

METHOD AND SYSTEM FOR GENERATING ALTERNATIVE IDENTIFICATION PAYMENT CARDS

FIELD

The present disclosure relates to the generating of alternative identification payment cards, specifically the generating of payment cards that include an alternative identification number that can be used for identification, organization, record keeping, and processing of a payment card without compromising an account number.

BACKGROUND

Payment cards, such as credit cards, debit cards, prepaid cards, etc., can often go through a long and elaborate creation and registration process prior to their ending up in the hands of the end cardholder. A card number must be generated, the number provided to a printing company, the physical card printed, the physical card provided to the distributor, and then finally distributed to the cardholder. With such a long and intricate process, and with the only means of identification of the payment card being the payment number embossed on and/or encoded in the card, there are a large number of instances where the account number may be compromised by one or more people involved in the process.

Thus, there is a need for a technical solution to provide for an alternative method of identification of a payment card that may be suitable for identification of the payment card without being able to be used to reverse-engineer the payment card number.

SUMMARY

The present disclosure provides a description of systems and methods for generating alternative identification payment cards A method for generating alternative identification payment cards includes: storing, in a database, a plurality of payment account numbers, wherein each payment account number is associated with a payment account; generating, by a processing device, an alternative identification number for each payment account number of the plurality of payment account numbers, wherein the alternative identification number includes at least a program identifier, a unique identifier, and a check value; generating, by the processing device, a data file including each payment account number of the plurality of payment account numbers and the generated alternative identification number for each respective payment account number; and transmitting, by a transmitting device, the generated data file for printing a plurality of payment cards.

A system for generating alternative identification payment cards includes a database, a processing device, and a transmitting device. The database is configured to store a plurality of payment account numbers, wherein each payment account number is associated with a payment account. The processing device is configured to: generate an alternative identification number for each payment account number of the plurality of payment account numbers, wherein the alternative identification number includes at least a program identifier, a unique identifier, and a check value; and generate a data file including each payment account number of the plurality of payment account numbers and the generated alternative identification number for each respective payment account number. The transmitting device is configured to transmit the generated data file for printing a plurality of payment cards.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Payment Card—A card or data associated with a transaction account that may be provided to a merchant in order to fund a financial transaction via the associated transaction account. Payment cards may include credit cards, debit cards, charge cards, stored-value cards, prepaid cards, fleet cards, virtual payment numbers, virtual card numbers, controlled payment numbers, etc. A payment card may be a physical card that may be provided to a merchant, or may be data representing the associated transaction account (e.g., as stored in a communication device, such as a smart phone or computer). For example, in some instances, data including a payment account number may be considered a payment card for the processing of a transaction funded by the associated transaction account. In some instances, a check may be considered a payment card where applicable.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account, and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc.

System for Generating Alternative Identification Payment Cards

Figure 1:
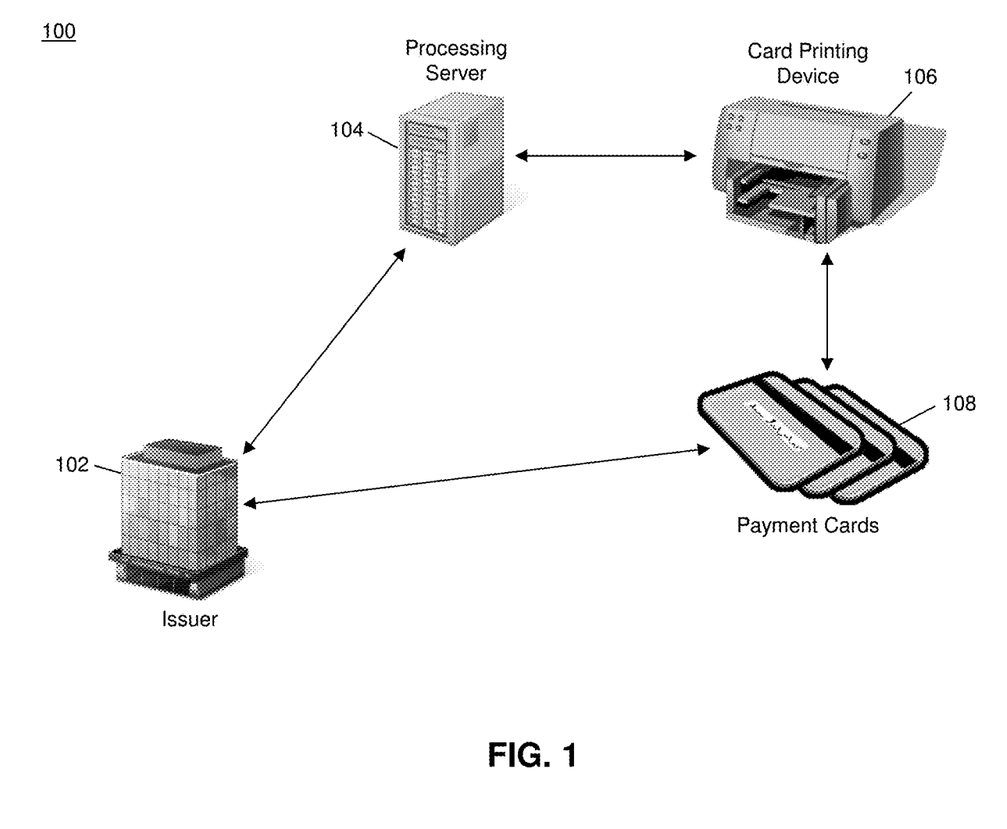
FIG. 1 is a high level architecture illustrating a system for generative alternative identification payment cards in accordance with exemplary embodiments.

FIG. 1 illustrates a system 100 for the generating of alternative identification payment cards.

The system 100 may include an issuer 102. The issuer 102 may be a financial institution that issues payment cards to one or more cardholders. The payment cards issued by the issuer may be, as discussed above, credit cards, debit cards, charge cards, stored-value cards, prepaid cards, etc. In some embodiments, payment cards issued by the issuer 102 and discussed herein may be physical payment cards. The issuer 102 may have a number of transaction accounts for which they need to issue payment cards. The issuer 102 may identify account numbers for each of the accounts and provide them to a processing server 104.

The processing server 104, discussed in more detail below, may be configured to generate alternative identification numbers for printing on or encoding in payment cards, to be used in the distribution and tracking of payment cards without the use of the account numbers. In some embodiments, the processing server 104 may be a part of the issuer 102. In other embodiments, each of the received payment account numbers may be encrypted by the issuer 102 such that the unencrypted account numbers cannot be identified by the processing server 104. For example, the issuer 102 may first encrypt the account numbers using a method of one-way encryption prior to transmission to the processing server 104.

The processing server 104, as discussed in more detail below, may generate an alternative identification number for each account number (e.g., encrypted or unencrypted) received. The alternative identification number may include at least a program identifier, a unique identifier, and a check value. The program identifier may be one or more values that may correspond to a program, entity, customer, etc., such as a specific issuer 102. For example, the program identifier may be a bank identification number, or may be a number specified by the issuer 102 for the account numbers for which alternative identification payment cards are being generated.

The unique identifier may be a number that, when combined with the program identifier and check value, may render the alternative identification number unique from other alternative identification numbers. In some embodiments, each unique identifier may be unique compared to all other unique identifiers. In other embodiments, a unique identifier may match another unique identifier only if the respective program identifier and/or check value is such that, when used in combination with the respective unique identifier, the two alternative identification numbers are different. In some embodiments, the unique identifier may be selected from a set of sequential numbers. For example, the processing server 104 may match a set of sequential numbers to a received list of account numbers as unique identifiers. In such an embodiment, later lists of account numbers may receive different sets of sequential numbers as unique identifiers to decrease the likelihood of reverse engineering of the account numbers.

The check value may be based on a calculation including the program identifier and unique identifier for the respective alternative identification number. For example, the check value may be a check digit used in conjunction with the Luhn algorithm. Other types of checksum formulas or methods that may be used in the generation of a check value for use in the alternative identification number as discussed herein will be apparent to persons having skill in the relevant art.

Once the alternative identification numbers have been generated, the account numbers and corresponding alternative identification numbers may be provided to a card printing device 106. The card printing device 106 may be any type of printing device suitable for printing payment cards and may be configured to print a plurality of payment cards 108. Each payment card 108 may include both the account number and the associated alternative identification number. As discussed in more detail below and illustrated in FIG. 5, the alternative identification number may be encoded in an element on the payment card, such as a machine-readable code, magnetic stripe, etc.

The payment cards 108 may then be delivered to the issuer 102. In some embodiments, the payment cards 108 may be packaged in envelopes or other suitable types of packaging with the account number hidden but the alternative identification number (e.g., and element in which it is encoded) viewable, such that the alternative identification may be used for processing, handling, and distribution of the payment card 108 without providing access to the account number. In such an embodiment, the payment card may go from printing and into the hands of a cardholder without anyone but the cardholder seeing the account number printed on the card, as all functions regarding processing and distribution of the card may be performed using the alternative identification number.

Using the methods and systems discussed herein, the processing server 104 may be configured to generative alternative identification numbers for use with payment cards that may greatly increase the security of the payment card. By enabling a payment card to be printed and distributed without providing handlers access to the account number, the likelihood that an account number may be compromised prior to issuance of the payment card to the consumer can be greatly decreased. In addition, correspondence between the cardholder and other entities may be able to use the alternative identification number to positively identify the payment card in question, without using any aspect of the actual account number, which may also decrease fraud and theft of the payment account.

Processing Server

Figure 2:
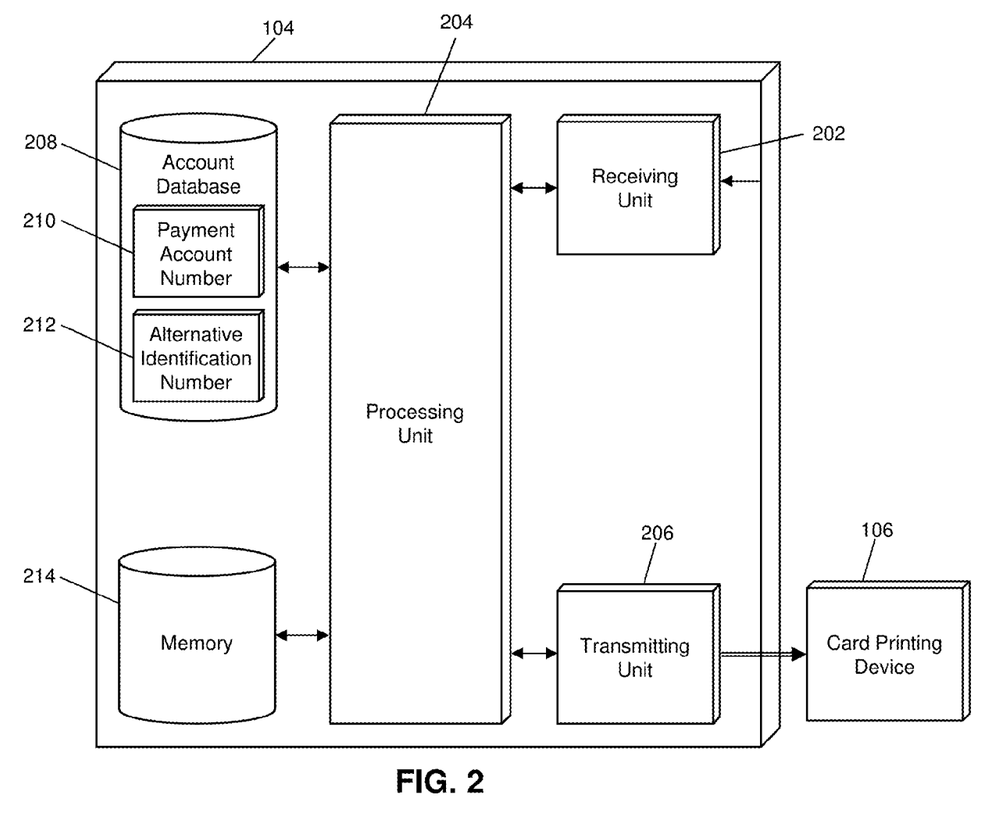
FIG. 2 is a block diagram illustrating the processing server of FIG. 1 for the generating of alternative identification numbers for payment cards in accordance with exemplary embodiments.
Figure 6:
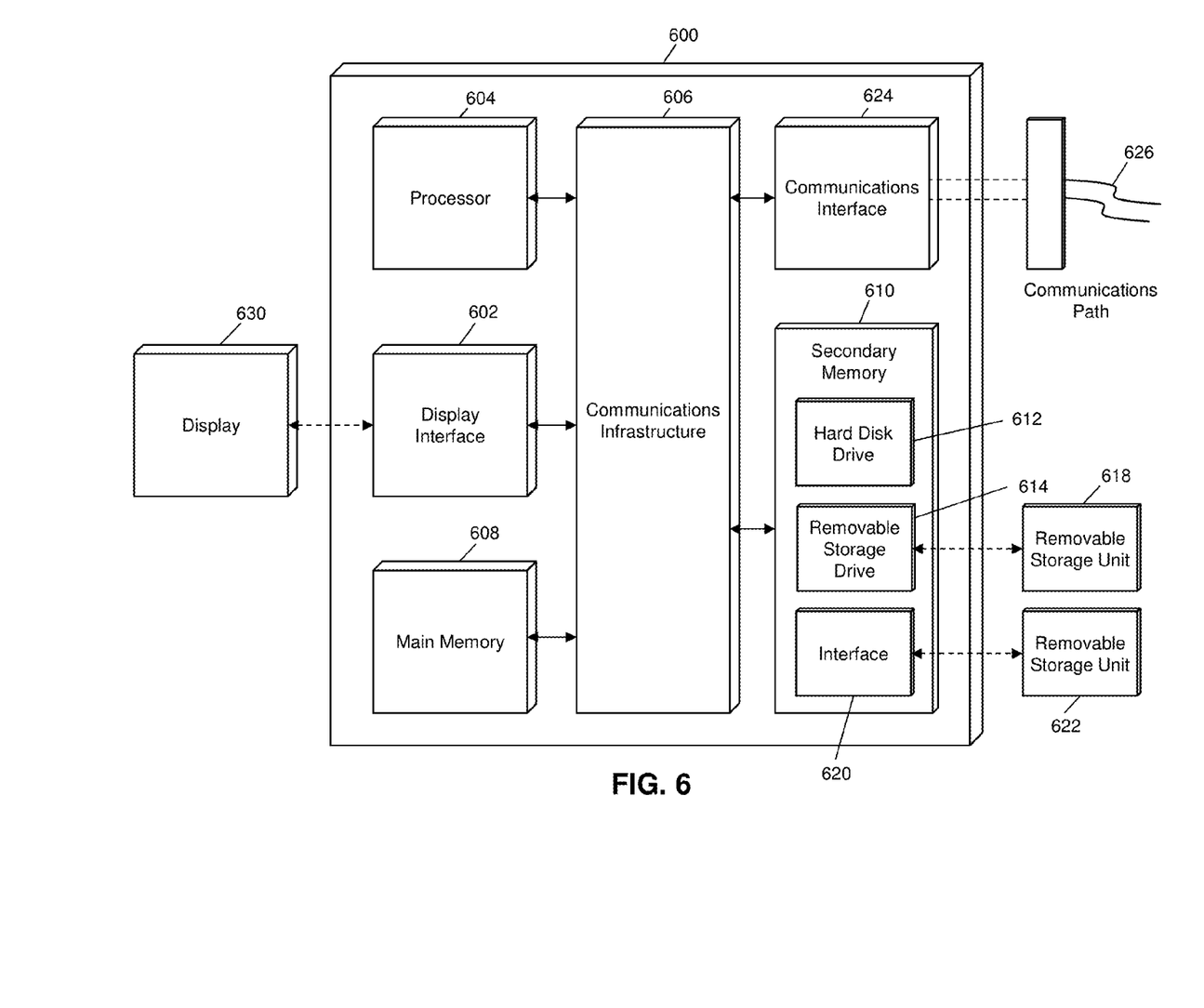
FIG. 6 is a block diagram illustrating a computer system architecture in accordance with exemplary embodiments.

FIG. 2 illustrates an embodiment of the processing server 104 of the system 100. It will be apparent to persons having skill in the relevant art that the embodiment of the processing server 104 illustrated in FIG. 2 is provided as illustration only and may not be exhaustive to all possible configurations of processing server 104 suitable for performing the functions as discussed herein. For example, the computer system 600 illustrated in FIG. processing server 104 and discussed in more detail below may be a suitable configuration of the processing server 104.

The processing server 104 may include a receiving unit 202. The receiving unit 202 may be configured to receive data over one or more networks via one or more network protocols. The receiving unit 202 may receive account numbers for which alternative identification payment cards are requested, from the issuer 102. The receiving unit 202 may also receive alternative identification number generation instructions, such as rules regarding unique identifiers or values for the program identifier or identifiers, and distribution instructions, such as instructions regarding packaging of generated cards and methods and destinations for distribution.

The processing server 104 may also include an account database 208. The account database 208 may be configured to store a plurality of payment account numbers 210. The payment account numbers 210 stored in the account database 208 may be based on the account numbers received from the issuer 102 by the receiving unit 202 for which alternative identification numbers are requested.

The processing server 104 may further include a processing unit 204. The processing unit 204 may be configured to perform the functions of the processing server 104 disclosed herein as will be apparent to persons having skill in the relevant art. For example, the processing unit 204 may be configured to generate an alternative identification number 212 for each payment account number 210 stored in the account database 208. In some instances, the processing unit 204 may store each generated alternative identification number 212 in the account database 208. In some embodiments, each payment account number 210 and corresponding alternative identification number 212 may be stored together as a single data entry.

The alternative identification numbers 212 generated by the processing unit 204 may include, as discussed above, a program identifier, a unique identifier, and a check value. In some embodiments, the unique identifier may be a random value generated by the processing unit 204. In other embodiments, the unique identifier may be a value included in a set of sequential numbers. In such an embodiment, the processing unit 204 may keep track of the values used in the set of sequential numbers. In some instances, the processing unit 204 may store data regarding the set of sequential numbers so that a subsequent set of alternative identification numbers 212 generated by the processing unit 204 do not use the same set of sequential numbers.

The processing server 104 may also include a memory 214. The memory 214 may be configured to store data suitable for performing the functions disclosed herein as will be apparent to persons having skill in the relevant art. For example, the memory 214 may store rules regarding program identifiers and their associated issuers 102, rules for the generating of sets of sequential numbers and/or for the generating of unique identifiers, algorithms for calculating check values, and other data.

The processing server 104 may further include a transmitting unit 206. The transmitting unit 206 may be configured to transmit data over one or more networks via one or more network protocols. The transmitting unit 206 may be configured to transmit the payment account numbers 210 and their corresponding generated alternative identification numbers 212 to the card printing device 106 for printing of payment cards. In some instances, the transmission may be of a data file generated by the processing unit 204 in a format suitable for receipt and processing by the card printing device 106. In some embodiments, the data file or transmission may indicate the desired position of the alternative identification number 212 on the printed payment card 108 and one or more preferences regarding encoding of the alternative identification number 212, such as specifying that a machine-readable code encoded with the alternative identification number 212 be displayed on the back of the payment card.

The transmitting unit 206 may be further configured to transmit the data file and/or data regarding payment account numbers 210 and generated alternative identification numbers 212 to the issuer 102 and/or a third party. For example, the transmitting unit 206 may transmit a list of the account numbers 210 and their corresponding alternative identification numbers 212 to the issuer 102 so that the issuer 102 will be able to identify which payment cards 108 go with which accounts using the alternative identification numbers 212, which may enable employees to handle and distribute the payment cards 108 without requiring access to the account numbers 210.

Process for Generating Alternative Identification Payment Cards

Figure 3:
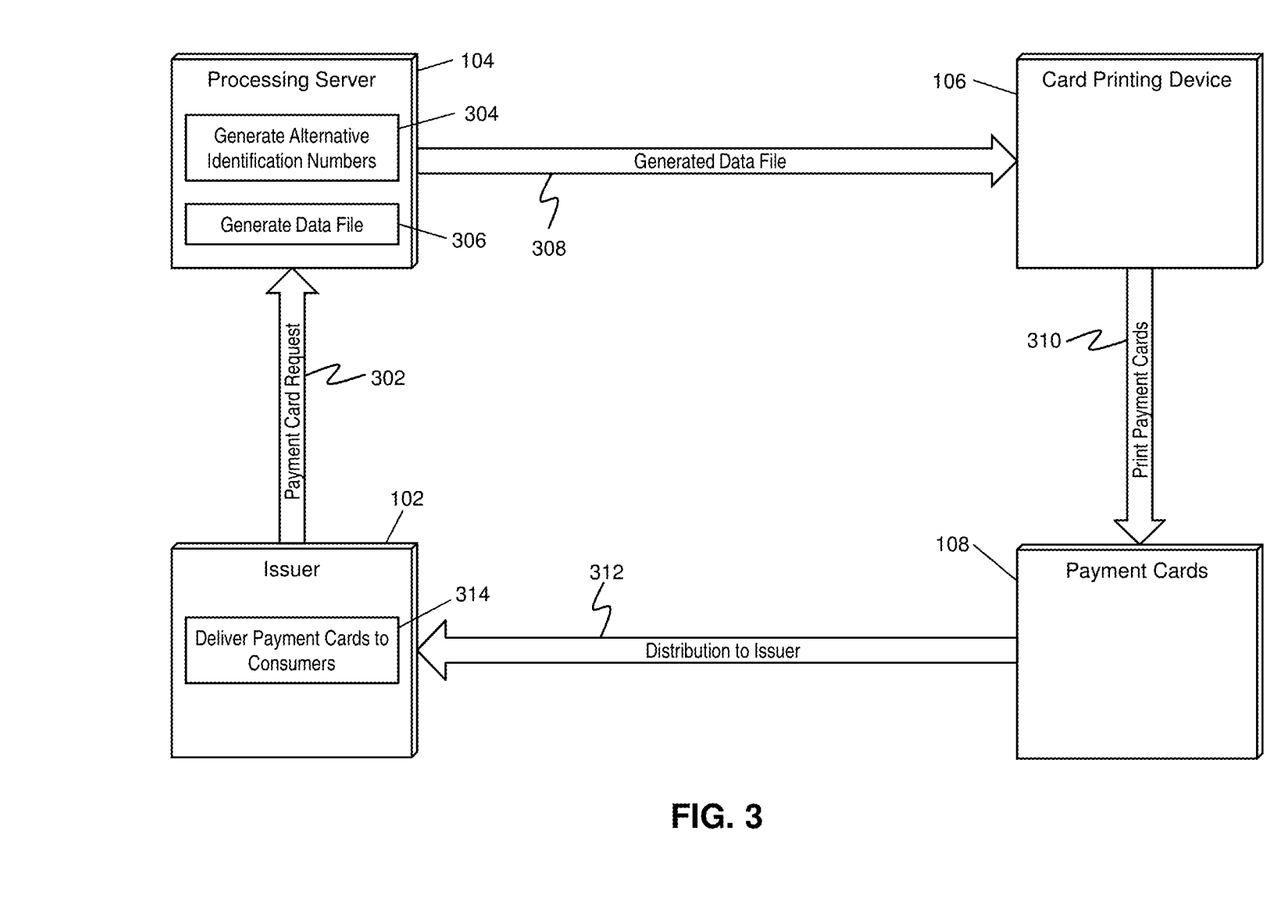
FIG. 3 is a flow diagram illustrating a process for generating alternative identification payment cards using the system of FIG. 1 accordance with exemplary embodiments.

FIG. 3 illustrates a process for the generation and distribution of alternative identification payment cards using the system 100 of FIG. 1.

In step 302, the issuer 102 may submit a payment card request to the processing server 104, to be received by the receiving unit 202. The payment card request may include a list of payment account numbers 210 and any other rules regarding the generation of alternative identification payment cards, such as unique identifier or program identifier rules and distribution rules. In step 304, the processing unit 204 of the processing server 104 may generate an alternative identification number 212 for each of the received payment account numbers 210.

In step 306, the processing unit 204 may generate a data file that includes each of the payment account numbers 210 and the corresponding generated alternative identification number 212. In step 308, the transmitting unit 206 of the processing server 104 may transmit the generated data file to the card printing device 106. In step 310, the card printing device 106 may print the payment cards 108 that include both the account number 210 and the corresponding alternative identification number 212 embossed on, encoded in, or otherwise included in the payment card 108. In some instances, the inclusion of each account number 210 and alternative identification number 212 may be specified in the payment card request submitted by the issuer 102.

In step 312, the payment cards 108 may be distributed to the issuer 102, such as based on rules set forth by the issuer 102 in the payment card request or as previously established. For instance, the payment cards 108 may be delivered in envelopes where the account number 210 is hidden from view as previously requested by the issuer 102. In step 314, the issuer 102 may distribute the payment cards 108 to consumers by using the alternative identification numbers 212.

Exemplary Method for Generating Alternative Identification Payment Cards

Figure 4:
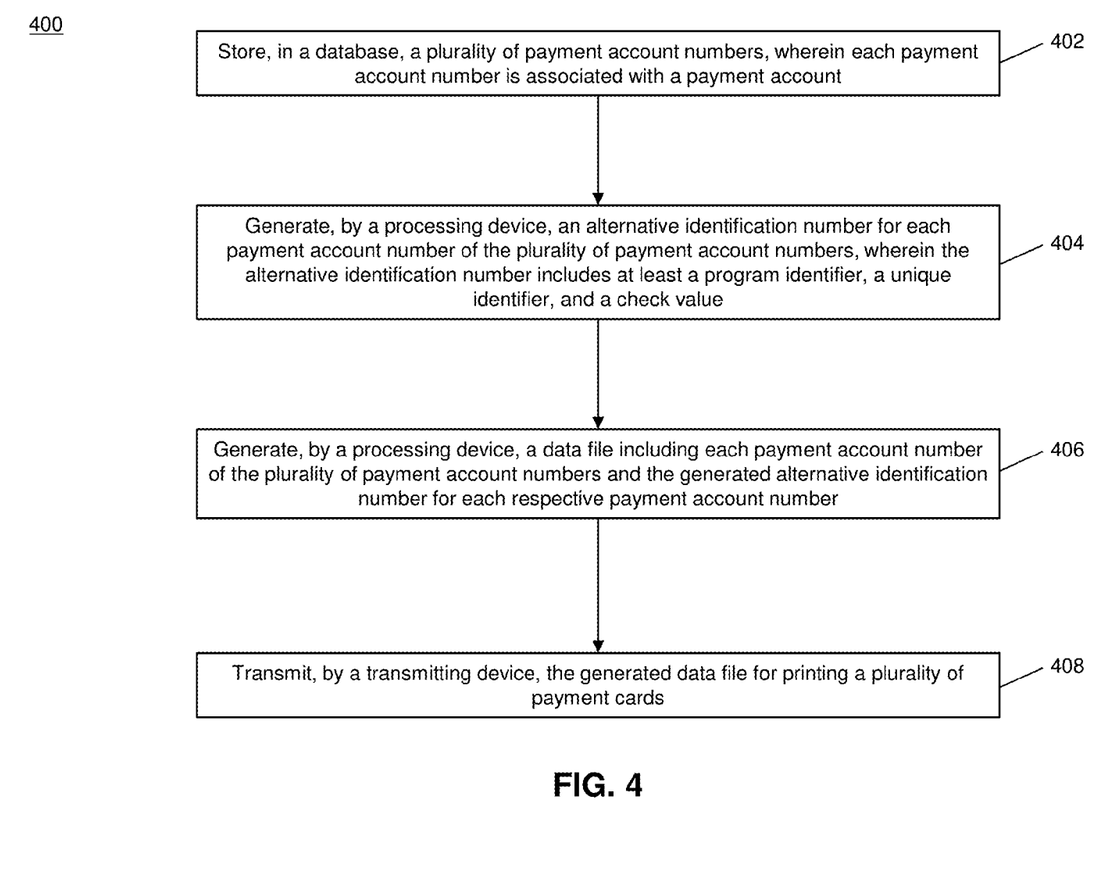
FIG. 4 is a flow chart illustrating an exemplary method for generating alternative identification payment cards in accordance with exemplary embodiments.

FIG. 4 illustrates a method 400 for the generation of alternative identification numbers for use in printing payment cards using the processing server 104.

In step 402, a plurality of payment account numbers (e.g., payment account numbers 210) may be stored in a database (e.g., the account database 208), wherein each payment account number 210 is associated with a payment account.

In step 404, an alternative identification number (e.g., alternative identification number 212) may be generated for each payment account number 210 of the plurality of payment account numbers by a processing device (e.g., the processing unit 204), wherein the alternative identification number 212 includes at least a program identifier, a unique identifier, and a check value. In one embodiment, the unique identifier included in each alternative identification number 212 generated for each payment account number 210 cannot be mathematically derived from the respective payment account number 210. In some embodiments, each unique identifier may include at least twelve digits, and wherein the last four digits of the unique identifier included in each alternative identification number 212 generated for each payment account number 210 may correspond to the last four digits of the respective payment account number 210.

In one embodiment, the check value may be based on a calculation including the program identifier and unique identifier. In some embodiments, the unique identifier included in each alternative identification number 212 generated for each payment account number 210 may be selected from a set of sequential numbers. In a further embodiment, a second set of alternative identification numbers 212 generated for a second set of payment account numbers 210 may be selected from a second set of sequential numbers.

In step 406, a data file may be generated by the processing device 204 including each payment account number 210 of the plurality of payment account numbers and the generated alternative identification number 212 for each respective payment account number.

In step 408, the generated data file may be transmitted by a transmitting device (e.g., the transmitting unit 206) for the printing of a plurality of payment cards (e.g., the payment cards 108). In some embodiments, the method 400 may also include printing, by a printing device (e.g., the card printing device 106), a plurality of payment cards 108 based on the generated data file, wherein each payment card 108 includes a payment account number 210 and corresponding alternative identification number 212 displayed on the payment card 108, the payment account number 210 displayed on each payment card 108 is not viewable through a package containing the respective payment card 108, and the alternative identification number 212 displayed on each payment card 108 is viewable through the package containing the respective payment card 108.

In one embodiment, the method 400 may further include printing, by the printing device 106, a plurality of payment cards 108 based on the generated data file. In a further embodiment, the payment account number 210 and alternative identification number 212 may be embossed on the printed payment card 108. In another further embodiment, each printed payment card 108 may include a first data element encoded with the payment account number 210 displayed on the payment card 108 and a second data element encoded with the alternative identification number 212 displayed on the payment card 108. In an even further embodiment, the first data element may be an integrated circuit card and/or a magnetic stripe and the second data element may be a bar code.

Generated Alternative Identification Payment Cards

Figure 5:
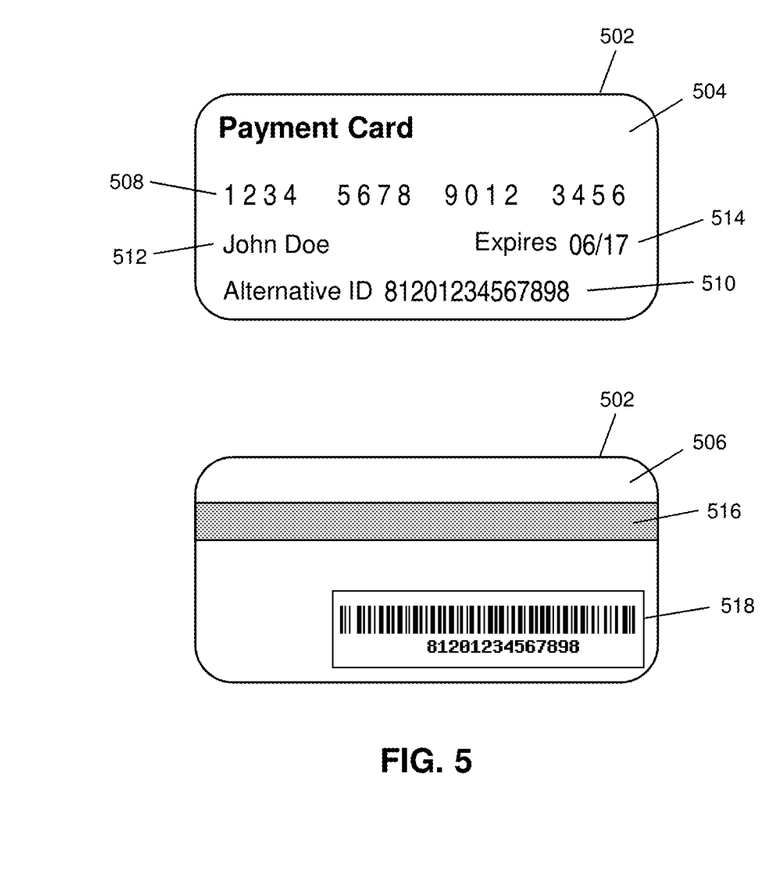
FIG. 5 is a diagram illustrating front and back surfaces of an alternative identification payment card generated using the system of FIG. 1 in accordance with exemplary embodiments.

FIG. 5 is an illustration of an exemplary alternative identification payment card 502 generated using the methods and systems discussed herein. It will be apparent to persons having skill in the relevant art that the alternative identification payment card 502 illustrated in FIG. 5 and discussed herein is an illustration only, and that different layouts, designs, and formats of the alternative identification payment card 502 may be used.

The alternative identification payment card 502 may include a front surface 504 and a back surface 506. The front surface 504 may be embossed with an account number 508, which may correspond to a payment account number 210 received by the processing server 104 and stored in the account database 208. The front surface 504 may also be embossed with an alternative identification number 510, which may correspond to an alternative identification number 212 generated for the payment account number 210 by the processing unit 204. The front surface 504 may also include a name 512, expiration date 514, and any other information that may be included on the front surface 504 of a payment card 502 as will be apparent to persons having skill in the relevant art, such as an issuer logo, card image, etc.

The back surface 506 may include a first data element 516 and a second data element 518. The first data element 516 may be a magnetic stripe encoded with at least the payment account number 508 embossed on the front surface 504 of the payment card 502. The magnetic stripe may also be encoded with other data as will be apparent to persons having skill in the relevant art, such as the cardholder name 512. The second data element 518 may be a machine readable code, such as a bar code, encoded with the alternative identification number 510 embossed on the front surface 504 of the payment card 502. The back surface 506 may also include additional information as will be apparent to persons having skill in the relevant art, such as a security code.

In some embodiments, the account number 508, alternative identification number 510, and second data element 518 may be positioned such that at least the account number 508 is hidden when the payment card 502 is placed in an envelope. For example, the payment card 502 may be placed in an envelope where a window in the envelope leaves only the bottom quarter of the payment card 502 viewable on either side, which may enable the alternative identification number 510 and second data element 518 both to be seen, but restrict view of the account number 508, name 512, or expiration date 514.

Computer System Architecture

FIG. 6 illustrates a computer system 600 in which embodiments of the present disclosure, or portions thereof, may be implemented as computer-readable code. For example, the processing server 104 or mail server 106 of FIG. 1 may be implemented in the computer system 600 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 618, a removable storage unit 622, and a hard disk installed in hard disk drive 612.

Various embodiments of the present disclosure are described in terms of this example computer system 600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device. The processor device 604 may be connected to a communications infrastructure 606, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 600 may also include a main memory 608 (e.g., random access memory, read-only memory, etc.), and may also include a secondary memory 610. The secondary memory 610 may include the hard disk drive 612 and a removable storage drive 614, such as a floppy disk drive, a magnetic tape drive, an optical disk drive, a flash memory, etc.

The removable storage drive 614 may read from and/or write to the removable storage unit 618 in a well-known manner. The removable storage unit 618 may include a removable storage media that may be read by and written to by the removable storage drive 614. For example, if the removable storage drive 614 is a floppy disk drive or universal serial bus port, the removable storage unit 618 may be a floppy disk or portable flash drive, respectively. In one embodiment, the removable storage unit 618 may be non-transitory computer readable recording media.

In some embodiments, the secondary memory 610 may include alternative means for allowing computer programs or other instructions to be loaded into the computer system 600, for example, the removable storage unit 622 and an interface 620. Examples of such means may include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art.

Data stored in the computer system 600 (e.g., in the main memory 608 and/or the secondary memory 610) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 600 may also include a communications interface 624. The communications interface 624 may be configured to allow software and data to be transferred between the computer system 600 and external devices. Exemplary communications interfaces 624 may include a modem, a network interface (e.g., an Ethernet card), a communications port, a PCMCIA slot and card, etc. Software and data transferred via the communications interface 624 may be in the form of signals, which may be electronic, electromagnetic, optical, or other signals as will be apparent to persons having skill in the relevant art. The signals may travel via a communications path 626, which may be configured to carry the signals and may be implemented using wire, cable, fiber optics, a phone line, a cellular phone link, a radio frequency link, etc.

The computer system 600 may further include a display interface 602. The display interface 602 may be configured to allow data to be transferred between the computer system 600 and external display 630. Exemplary display interfaces 602 may include high-definition multimedia interface (HDMI), digital visual interface (DVI), video graphics array (VGA), etc. The display 630 may be any suitable type of display for displaying data transmitted via the display interface 602 of the computer system 600, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 608 and secondary memory 610, which may be memory semiconductors (e.g., DRAMs, etc.). These computer program products may be means for providing software to the computer system 600. Computer programs (e.g., computer control logic) may be stored in the main memory 608 and/or the secondary memory 610. Computer programs may also be received via the communications interface 624. Such computer programs, when executed, may enable computer system 600 to implement the present methods as discussed herein. In particular, the computer programs, when executed, may enable processor device 604 to implement the methods illustrated by FIGS. 3 and 4, as discussed herein. Accordingly, such computer programs may represent controllers of the computer system 600. Where the present disclosure is implemented using software, the software may be stored in a computer program product and loaded into the computer system 600 using the removable storage drive 614, interface 620, and hard disk drive 612, or communications interface 624.

Techniques consistent with the present disclosure provide, among other features, systems and methods for generating alternative identification payment cards. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A computer-implemented method for electronically generating alternative identification payment cards, comprising:

electronically receiving, by a receiving device of a processing server device, a payment card request from a payment card issuer for the generation of alternative identification numbers;

storing, in a memory device of the processing server device, a plurality of payment account numbers, wherein each payment account number is associated with a payment account;

in response to the payment card request received from the payment card issuer, electronically generating, by a processing device of the processing server device that is electronically coupled to and configured to communicate data with the memory device, an alternative identification number for each payment account number of the plurality of payment account numbers, to be included on payment cards in addition to each payment account number, wherein the alternative identification number includes at least a program identifier, a unique identifier, and a check value;

electronically generating, by the processing device of the processing server device, a data file including each payment account number of the plurality of payment account numbers and the generated alternative identification number for each respective payment account number; and transmitting, by a transmitting device of the processing server device, the generated data file to a card printing device for printing a plurality of payment cards including both respective payment account numbers and respective generated alternative identification numbers included in said generated data file, wherein said processing server device is configured to electronically communicate with said card printing device via a communication network.

2. The method of claim 1, wherein the payment account number and alternative identification number displayed on each payment card are embossed on the printed payment card.

3. The method of claim 1, wherein each printed payment card includes a first data element encoded with the payment account number displayed on the payment card, and a second data element encoded with the alternative identification number displayed on the payment card.

4. The method of claim 3, wherein the first data element is at least one of: an integrated circuit card and a magnetic stripe, and wherein the second data element is a bar code.

5. The method of claim 1, wherein the check value is based on a calculation including the program identifier and unique identifier.

6. The method of claim 1, wherein the unique identifier included in each alternative identification number generated for each payment account number is selected from a set of sequential numbers.

7. The method of claim 6, wherein a second set of alternative identification numbers generated for a second set of payment account numbers is selected from a second set of sequential numbers.

8. The method of claim 1, wherein the unique identifier included in each alternative identification number generated for each payment account number cannot be mathematically derived from the respective payment account number.

9. The method of claim 1, wherein each unique identifier includes at least twelve digits, and wherein the last four digits of the unique identifier included in each alternative identification number generated for each payment account number corresponds to the last four digits of the respective payment account number.

10. The method of claim 1,
wherein
each payment card includes a payment account number and corresponding alternative identification number displayed on the payment card,
the payment account number displayed on each payment card is not viewable through a package containing the respective payment card, and
the alternative identification number displayed on each payment card is viewable through the package containing the respective payment card.

11. A system for generating alternative identification payment cards, comprising:
a card issuing device configured to electronically transmit a payment card request to a processing server device for the generation of alternative identification numbers, said payment card request includes at least a plurality of payment account number;

a memory device, of the processing server device, configured to store the plurality of payment account numbers electronically received from said card issuing device, wherein each payment account number is associated with a payment account;

a processing device, of the processing server device, that is electronically coupled to and configured to communicate data with the memory device, said processing device being configured to electronically generate, in response to the payment card request received from the card issuing device, an alternative identification number for each payment account number of the plurality of payment account numbers, to be included on payment cards in addition to each payment account number, wherein the alternative identification number includes at least a program identifier, a unique identifier, and a check value, and electronically generate a data file including each payment account number of the plurality of payment account numbers and the generated alternative identification number for each respective payment account number;

a transmitting device, of the processing server device, configured to transmit the generated data file for printing a plurality of payment cards; and a printing device configured to electronically receive said generated data file from said processing server device and to print a plurality of payment cards including both respective payment account numbers and respective alternative identification numbers included in said received generated data file.

12. The system of claim 11, wherein the payment account number and alternative identification number are displayed on each payment card are embossed on the printed payment card.

13. The system of claim 11, wherein each printed payment card includes a first data element encoded with the payment account number displayed on the payment card, and a second data element encoded with the alternative identification number displayed on the payment card.

14. The system of claim 13, wherein the first data element is at least one of: an integrated circuit card and a magnetic stripe, and wherein the second data element is a bar code.

15. The system of claim 11, wherein the check value is based on a calculation including the program identifier and unique identifier.

16. The system of claim 11, wherein the unique identifier included in each alternative identification number generated for each payment account number is selected from a set of sequential numbers.

17. The system of claim 16, wherein a second set of alternative identification numbers generated for a second set of payment account numbers is selected from a second set of sequential numbers.

18. The system of claim 11, wherein the unique identifier included in each alternative identification number generated for each payment account number cannot be mathematically derived from the respective payment account number.

19. The system of claim 11, wherein each unique identifier includes at least twelve digits, and wherein the last four digits of the unique identifier included in each alternative identification number generated for each payment account number corresponds to the last four digits of the respective payment account number.

20. The system of claim 11,
wherein
each payment card includes a payment account number and corresponding alternative identification number displayed on the payment card,
the payment account number displayed on each payment card is not viewable through a package containing the respective payment card, and
the alternative identification number displayed on each payment card is viewable through the package containing the respective payment card.

* * * * *